(12) United States Patent
Chai

(10) Patent No.: US 10,972,613 B2
(45) Date of Patent: Apr. 6, 2021

(54) CHARGING CONTROL METHOD, CHARGING TRIGGER APPARATUS, AND ONLINE CHARGING SYSTEM

(71) Applicant: HUAWEI TECHNOLOGIES CO., LTD., Guangdong (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/258,502

(22) Filed: Jan. 25, 2019

(65) Prior Publication Data
US 2019/0158677 A1    May 23, 2019

Related U.S. Application Data

(63) Continuation of application No. 14/615,645, filed on Feb. 6, 2015, now Pat. No. 10,205,832, which is a
(Continued)

(51) Int. Cl.
*G06Q 40/00* (2012.01)
*H04M 15/00* (2006.01)
*H04L 12/14* (2006.01)

(52) U.S. Cl.
CPC ........ *H04M 15/64* (2013.01); *H04L 12/1403* (2013.01); *H04L 12/1467* (2013.01);
(Continued)

(58) Field of Classification Search
CPC ................................ G06Q 30/12; H04M 15/64
(Continued)

(56) References Cited

U.S. PATENT DOCUMENTS

| | | | | | |
|---|---|---|---|---|---|
| 8,489,069 | B2 * | 7/2013 | Tang | ................... | H04W 72/087 |
| | | | | | 455/406 |
| 9,576,307 | B2 * | 2/2017 | Cassel | ................... | G06Q 30/04 |

(Continued)

FOREIGN PATENT DOCUMENTS

| CN | 101075887 A | 11/2007 |
|---|---|---|
| CN | 101141266 A | 3/2008 |

(Continued)

OTHER PUBLICATIONS

"3GPP TS 32.251 V11.3.0 (Jun. 2012) 3rd Generation Partnership Project;Technical Specification Group Services and System Aspects;Telecommunication management;Charging management;Packet Switched (PS) domain charging (Release 11), 89 pages".

(Continued)

*Primary Examiner* — Rokib Masud
(74) *Attorney, Agent, or Firm* — Huawei Technologies Co., Ltd.

(57) ABSTRACT

The present disclosure provides a charging control method, a charging trigger apparatus, and an online charging system. The method includes: generating, by a CTF, a resource quota request according to a trigger condition; and sending the resource quota request to an online charging system (OCS), so that the OCS determines a quota type and number after receiving the resource quota request, and allocates a quota for the resource quota request according to the quota type and number determined by the OCS, where the quota type and number are determined by the OCS according to the resource quota request. In the foregoing method, a problem that in the prior art, a charging control error occurs due to different determining bodies of a quota type is solved.

22 Claims, 9 Drawing Sheets

Related U.S. Application Data continuation of application No. PCT/CN2012/079839, filed on Aug. 8, 2012.

(52) U.S. Cl.
CPC .......... *H04M 15/60* (2013.01); *H04M 15/62* (2013.01); *H04M 15/785* (2013.01); *H04M 15/8207* (2013.01); *H04M 15/8214* (2013.01); *H04L 12/1485* (2013.01)

(58) Field of Classification Search
USPC .................................................. 705/400, 40
See application file for complete search history.

(56) References Cited

U.S. PATENT DOCUMENTS

| | | | |
|---|---|---|---|
| 2005/0286686 A1* | 12/2005 | Krstulich | G06Q 30/0284 379/32.01 |
| 2006/0286963 A1 | 12/2006 | Koskinen et al. | |
| 2009/0024502 A1* | 1/2009 | Xie | H04M 15/00 705/35 |
| 2011/0067085 A1 | 3/2011 | Brouard et al. | |
| 2012/0123919 A1 | 5/2012 | Li et al. | |
| 2013/0084881 A1 | 4/2013 | Tang | |
| 2014/0357220 A1* | 12/2014 | Raghavendra | H04L 12/1407 455/406 |

FOREIGN PATENT DOCUMENTS

| | | |
|---|---|---|
| CN | 101166109 A | 4/2008 |
| CN | 101296092 A | 10/2008 |
| CN | 101316175 A | 12/2008 |
| CN | 102026139 A | 4/2011 |
| CN | 102137373 A | 7/2011 |
| CN | 102143466 A | 8/2011 |
| WO | 2012067775 A2 | 5/2012 |
| WO | 2012079647 A1 | 6/2012 |

OTHER PUBLICATIONS

"3GPP TS 32.299 V11.4.0 (Jun. 2012) 3rd Generation Partnership Project;Technical Specification Group Services and System Aspects;Telecommunication management;Charging management;Diameter charging applications (Release 11), 151 pages".

"3GPP TS 32.240 V11.4.0 (Jun. 2012) 3rd Generation Partnership Project;Technical Specification Group Services and System Aspects;Telecommunication management;Charging management;Charging architecture and principles (Release 11), 45 pages".

"3GPP TS 23.203 V11.6.0 (Jun. 2012)3rd Generation Partnership Project; Technical Specification Group Services and System Aspects; Policy and charging control architecture(Release 11), 176 pages".

Hiakala L Mattila Ericsson J-P Koskinen M Stura J Loughney Nokia H :"Diameter Credict-Control Application ;RFC4006.txt", Aug. 1, 2005, XP015041993, 114 pages.

Bart Barton:"Online Charging System (OCS)—introduction to Gy interface LTE and Beyond Tech-blog on 4G /LTE and beyond", Jul. 24, 2012, XP055187969, 8 pages.

* cited by examiner

A PCRF sends a first message that includes a service unit type to a CTF, or sends a first message that includes instruction information, or sends a first message that includes the service unit type and the instruction information, so that the CTF generates a resource quota request according to the first message ~ 601

The PCRF sends a second message that includes a service unit type to the CTF, so that the CTF determines whether the service unit type in the second message is consistent with a service unit type in a quota with the use currently monitored by the CTF, and if not, updates a use record ~ 602

FIG. 6

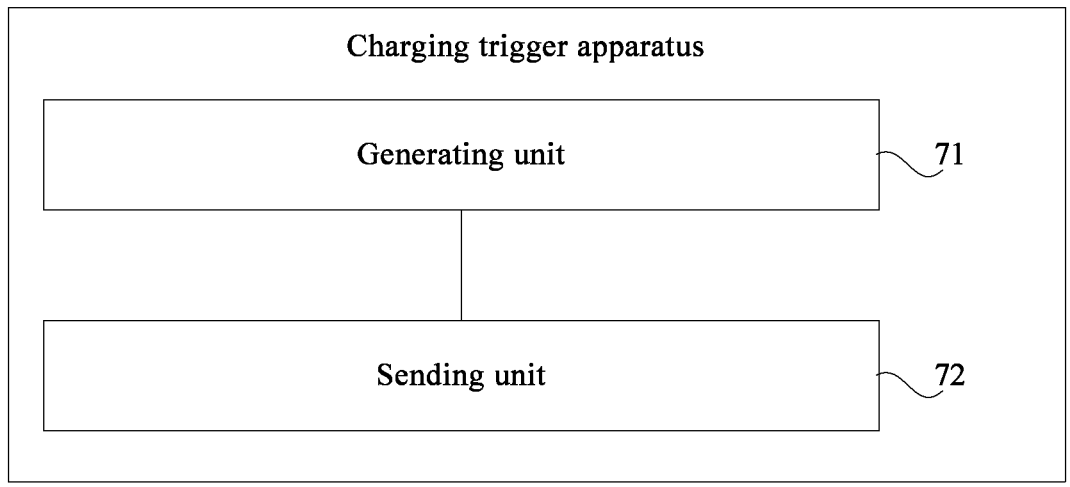

FIG. 7

CHARGING CONTROL METHOD, CHARGING TRIGGER APPARATUS, AND ONLINE CHARGING SYSTEM

CROSS-REFERENCE TO RELATED APPLICATIONS

This application is a continuation of U.S. patent application Ser. No. 14/615,645, filed on Feb. 6, 2015, which is a continuation of International Application No. PCT/CN2012/079839, filed on Aug. 8, 2012, all of which are hereby incorporated by reference in their entireties.

TECHNICAL FIELD

The present disclosure relates to communications technologies, and in particular, to a charging control method, a charging trigger apparatus, and an online charging system.

BACKGROUND

Current charging manners include: online charging and offline charging. Online charging is a currently most popular charging manner. In an online charging manner, credit authorization can be performed before a user uses a service, fee deduction can be performed in real time according to usage information of the user, and further, real-time control on credit can be achieved, thereby preventing the user from using a service beyond credit to cause loss to an operator, and improving user experience (accurate balance and use information can be queried in real time). In addition, by using a real-time capability of the online charging, granularity information of a user service layer can be obtained in real time, and further, refined control can be triggered on a service used by a user.

A main mechanism of the online charging is credit authorization, that is, before a service is used, a charging trigger function (CTF) apparatus applies for a credit quota from an online charging system (OCS); the OCS performs credit quota authorization; and after the authorization, the CTF performs service control according to the credit quota authorized by the OCS. When the CTF applies for a credit quota, credit unit determination (UD) is required as a reference for the OCS to perform credit quota authorization. The Unit determination herein specifically refers to the number of credit units required for calculation. Credit units include a service unit, traffic, duration, an event, and the like.

There are two existing credit unit determination manners: a first one, centralized unit determination (CUD), where an OCS determines the number of required credit units; and a second one, decentralized unit determination (DUD), where a CTF determines the number of required credit units, and requests credit units of the number from an OCS.

However, in a process of implementing the online charging, the following problem may occur: Determining bodies of UD are different, causing a conflict between determined quota types. Specifically, a CTF and an OCS are provided by different vendors, and the CTF and the OCS both have a function of implementing quota type determination. However, the CTF implements quota type determination according to a service session request, and the OCS implements quota type determination according to information reported by the CTF and an operation mode of an operator. The determined quota types may conflict, and therefore a charging session is further affected, and a charging control error may occur.

SUMMARY

In view of this, the present disclosure provides a charging control method, a charging trigger apparatus, and an online charging system, to avoid the problem that in the prior art, a charging control error occurs due to different determining bodies of a quota type.

According to one aspect, a charging control method provided in an embodiment of the present disclosure includes:

generating, by a CTF, a resource quota request according to a trigger condition; and sending the resource quota request to an OCS, so that the OCS determines a quota type and number after receiving the resource quota request, and allocates a quota for the resource quota request according to the quota type and the number determined by the OCS;

the quota type and the number are determined by the OCS according to the resource quota request.

According to another aspect, a charging control method provided in an embodiment of the present disclosure includes:

receiving, by an OCS, a resource quota request sent by a CTF, and determining a quota type and the number of quota of the quota type according to the resource quota request; and allocating a quota for the resource quota request according to the quota type and the number determined by the OCS.

According to a third aspect, a charging control method provided in an embodiment of the present disclosure includes:

receiving, by a CTF, a second message sent by a PCRF, the second message carries a service unit type, and the service unit type is used to indicate that the CTF needs to collect, according to the service unit type, use information of a service or service flow specified by the second message; and determining, by the CTF, whether the service unit type in the second message is consistent with a current service unit type recorded by the CTF; and if the service unit type in the second message is inconsistent with a current service unit type recorded by the CTF, closing, by the CTF, a counter corresponding to the currently used service unit type in the CTF, writing information recorded by the counter into a bill, and enabling a counter corresponding to the service unit type in the second message, so as to collect use information of a service.

According to a fourth aspect, a charging trigger apparatus provided in an embodiment of the present disclosure includes:

a generating unit, configured to generate a resource quota request according to a trigger condition; and a sending unit, configured to send the resource quota request to an online charging system OCS, so that the OCS determines a quota type and the number of quota of the quota type after receiving the resource quota request, and allocates a quota for the resource quota request according to the quota type and number determined by the OCS; where:

the quota type and number are determined by the OCS according to the resource quota request.

According to a fifth aspect, an online charging system provided in an embodiment of the present disclosure includes:

a receiving unit, configured to receive a resource quota request sent by a charging trigger apparatus CTF;

a determining unit, configured to determine a quota type and the number of quota of the quota type according to the resource quota request; and an allocating unit, configured to allocate a quota for the resource quota request according to the quota type and number determined by the OCS.

It can be known from the foregoing technical solutions that, in the charging control method, charging trigger apparatus, and online charging system of the present disclosure, a CTF generates, according to a trigger condition, a resource quota request that is to be sent to an OCS, so that the OCS determines a quota type and number after receiving the resource quota request, and allocates a quota for the resource quota request according to the quota type and number determined by the OCS, thereby further solving a problem that in the prior art, a charging control error occurs due to different determining bodies of a quota type.

BRIEF DESCRIPTION OF DRAWINGS

To describe the technical solutions of the present disclosure more clearly, the following briefly introduces accompanying drawings for describing the embodiments. Apparently, the accompanying drawings in the following description merely show some embodiments of the present disclosure, and persons of ordinary skill in the art can derive other drawings according to these accompanying drawings without creative efforts.

FIG. 6 is a schematic flowchart of a charging control method according to another embodiment of the present disclosure;

FIG. 7 is a schematic structural diagram of a charging trigger apparatus according to an embodiment of the present disclosure;

DETAILED DESCRIPTION

Figure 1:
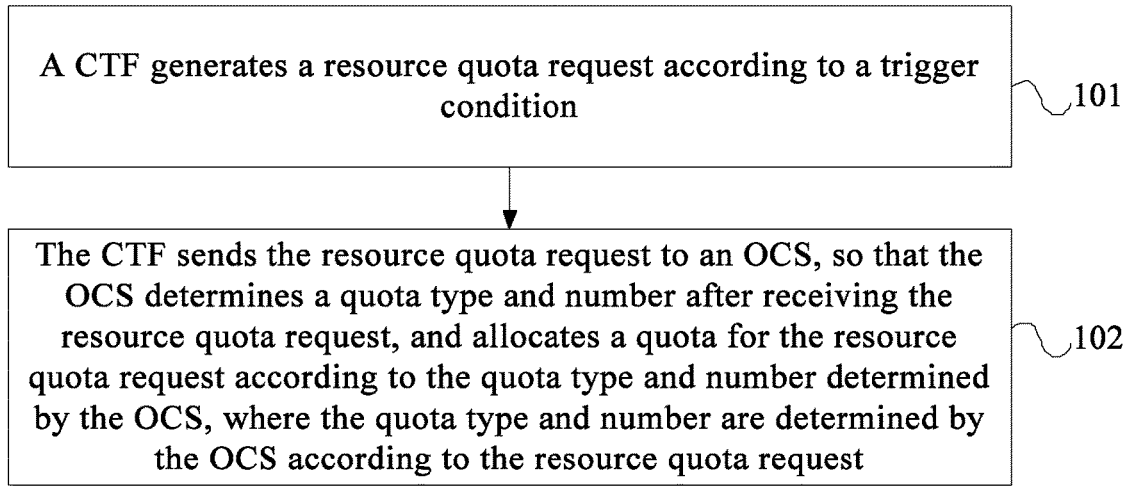
FIG. 1 is a schematic flowchart of a charging control method according to an embodiment of the present disclosure.

To make the objectives, technical solutions, and advantages of the present disclosure clearer, the following clearly describes the technical solutions of the present disclosure with reference to accompanying drawings in the embodiments of the present disclosure. Apparently, the embodiments to be described are a part of the embodiments of the present disclosure. Based on the following embodiments of the present disclosure, persons of ordinary skill in the art can obtain other embodiments used to solve the technical issue of the present disclosure and achieve the technical effect of the present disclosure by making equivalent changes to a part of or all technical features, without creative efforts, and the embodiments obtained through the changes evidently fall within the scope of the present disclosure.

Currently, policy and charging control (PCC) is a set of policy and charging control mechanism defined by the 3rd Generation Partnership Project (3GPP). A core of the PCC mechanism is: When a data flow bearer is established, a gateway (GW) device requests a control policy and a charging policy of a data flow from a policy and charging control module (PCRF); the PCRF generates a dynamic charging and service data flow control policy or determines a static charging and service data flow control policy that needs to be activated according to subscriber information stored in a subscription profile repository (SPR), bearer layer information provided by the GW, some local policies configured by an operator in the PCRF, and service layer information provided by an application function (AF) module for the PCRF, and further delivers a command to the GW to install the generated dynamic charging and service data flow control policy, or activate the determined static charging and service data flow control policy that is stored in the GW; and a policy and charging execution function (PCEF) module in the GW performs resource allocation, data flow control, and charging control according to the installed/activated policy. In the mechanism, precise control can be performed on a service data flow according to an operator policy, so as to implement refined operation of bandwidth.

In addition, in a current charging session process, there may be a charging scenario in which traffic and duration switching is performed, that is, duration-based charging is performed on a data service in a certain period, and traffic-based charging is performed on the data service in another period. The following problems exist in the scenario: First, in a switching process, a quota type determined by a CTF may conflict with a quota type determined by an OCS, thereby affecting a charging session and affecting switching of the charging scenario; second, in a charging scenario switching process, there is a problem that a large amount of signaling is instantaneously generated at a specific time point, thereby exerting an impact on the OCS and CTF.

It should be specially noted that, the following description is specific to a certain terminal and is applicable to charging control on all terminals. It can be understood that, a PCRF, a CTF, and an OCS correspond to a charging control process performed by a same user identifier. Persons skilled in the art can easily perform implementation in an environment of multiple terminals according to this solution. In addition, a quota type and number mentioned in the following are specifically: a quota type and the number corresponding to the quota type.

The term "and/or" in the specification is only an association relationship describing associated objects, and represents that three relationships may exist, for example, A and/or B may represent the following three cases: A exists alone, both A and B exist, and B exists alone. In addition, the character "/" in the specification usually represents that the former and latter associated objects are in an "or" relationship.

FIG. 1 is a schematic flowchart of a charging control method according to a first embodiment of the present disclosure. As shown in FIG. 1, the charging control method in this embodiment is described as follows.

101: A CTF generates a resource quota request according to a trigger condition.

For example, the foregoing trigger condition may be either of the following information:
1. the CTF receives a service start request sent by a terminal;
2. the CTF detects that a quota of a previous service is used up, and the like.

In this embodiment, content of a trigger condition is not limited, and any event that can trigger a resource quota request may be taken as a trigger condition.

In this embodiment, the resource quota request may carry a quota type and number specified by the CTF, or the resource quota request does not carry a quota type and number, as described in the following embodiments that a resource quota request carries a quota type and number, or a resource quota request does not carry a quota type and number.

In an actual application, the foregoing resource quota request may be a CCR message. If the resource quota request carries a quota type and number determined by the CTF, in this case, a reserved resource unit (RSU) parameter in the CCR message may be used to carry the quota type and number determined by the CTF.

For example, in this embodiment, a quota type may be duration or traffic. When the quota type is duration, the number of quota of the quota type may be 10 minutes, 5 minutes, or the like; and when the quota type is traffic, the number of quota of the quota type may be 2 M, 1.5 M, or the like.

102: The CTF sends the resource quota request to an OCS, so that the OCS determines a quota type and number after receiving the resource quota request, and allocates a quota for the resource quota request according to the quota type and number determined by the OCS.

The quota type and number are determined by the OCS according to the resource quota request.

It should be understood that, the allocated quota includes: the quota type and the number of quota of the quota type.

For example, if the CTF specifies a quota type and number in the resource quota request, that is, the resource quota request carries the quota type and number specified by the CTF, the OCS determines, according to the quota type and number specified by the CTF, whether the quota type and number specified by the CTF are valid. If the OCS determines, according to configuration information of the OCS (such as a package corresponding to a user identifier, operator information, user subscription information, a user level, and balance of a user account) and service information sent by the CTF, that the quota type and number specified by the CTF are valid (being valid means that the OCS accepts the quota type specified by the CTF and can meet the quota number specified by the CTF), the OCS allocates a quota for the resource quota request according to a quota type and number determined by the OCS. If the OCS determines, according to configuration information of the OCS and service information sent by the CTF, that the quota type and number specified by the CTF are invalid, the OCS re-determines a quota type and number according to the configuration information of the OCS and the service information sent by the CTF, and further allocates a quota for the resource quota request according to the quota type and number determined by the OCS.

Alternatively, the CTF does not specify a quota type and number in the resource quota request. In this case, the resource quota request does not carry a quota type and number, and the OCS determines a quota type and number according to configuration information of the OCS, and further allocates a quota for the resource quota request according to the quota type and number determined by the OCS.

Certainly, the quota type and number specified by the CTF in the resource quota request may be a quota type and number determined by the CTF according to configuration information of the CTF, or a quota type and number determined by the CTF according to a message delivered by a PCRF.

Figure 2:
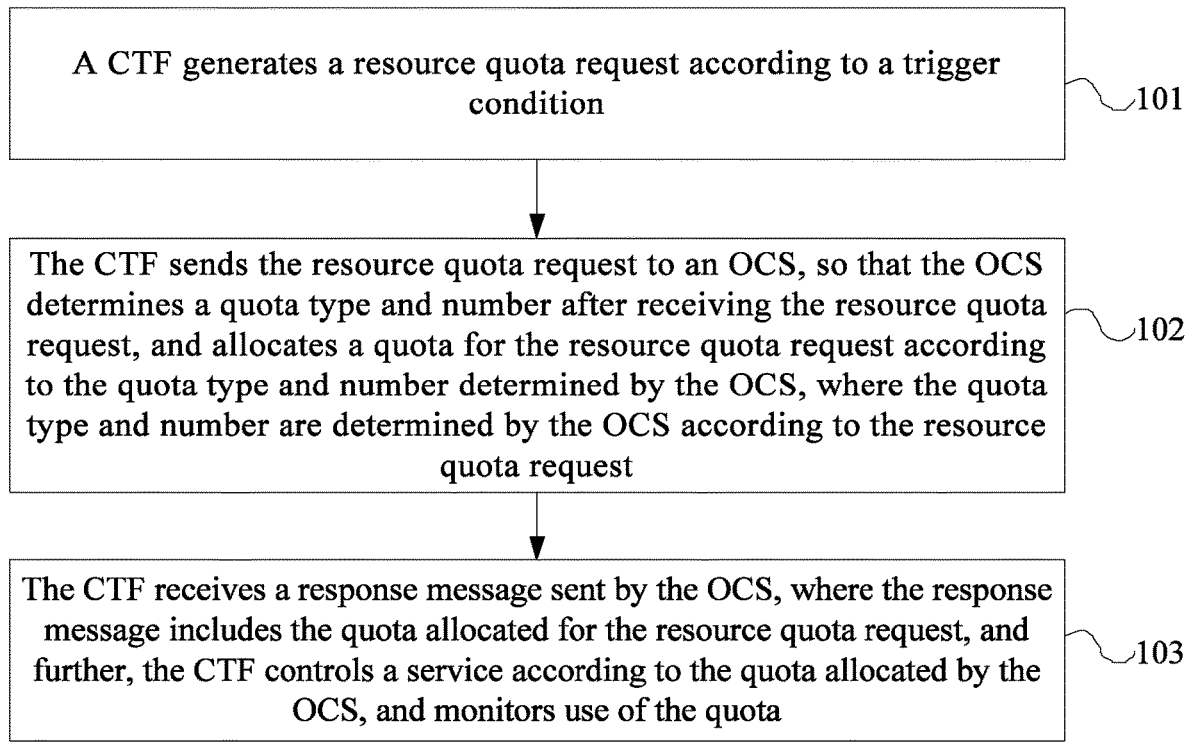
FIG. 2 is a schematic flowchart of a charging control method according to another embodiment of the present disclosure.

In another implementation scenario, as shown in FIG. 2, the charging control method further includes the following step 103.

103: The CTF receives a response message sent by the OCS, where the response message includes the quota allocated for the resource quota request, and further, the CTF controls a service according to the quota allocated by the OCS, and monitors use of the quota.

It should be noted that, after the CTF receives the response message, if a quota type originally specified in the CTF is different from a quota type included in the response message, the CTF controls a service according to the quota type in the response message. That is, when the quota type specified by the CTF conflicts with the quota type determined by the OCS, a service is controlled according to the quota type determined by the OCS.

In an actual application, a response message returned by the OCS according to the resource quota request refers to a credit control answer (CCA) message that carries a granted resource unit (GSU) parameter and is returned by the OCS to the CTF. The GSU parameter herein carries the foregoing quota allocated by the OCS.

Specifically, the foregoing step 101 may include the following content:

101*a*: After the trigger condition is met, the CTF checks whether a first message that carries a service unit type and/or instruction information and is sent by the PCRF is received; and if the CTF determines that the foregoing first message is not received, the CTF generates a resource quota request according to configuration information of the CTF.

The service unit type in this step is used to specify a quota type carried, by the CTF, in the generated resource quota request, and the instruction information in this step may be information that is used to instruct the CTF to specify a quota type and number, or the instruction information may be information that is used to instruct the CTF not to specify a quota type or number, or the like.

In an actual application, that the CTF generates a resource quota request according to configuration information of the CTF specifically includes:

the CTF checks, according to configuration information of the CTF, whether a quota type and number need to be determined; and if a quota type and number need to be determined, the CTF specifies a quota type and number according to the configuration information of the CTF, and generates a resource quota request according to the specified quota type and number, where the resource quota request includes the quota type and number specified by the CTF; and if no quota type or number needs to be determined, the CTF directly generates a resource quota request, where the resource quota request does not include a quota type and number.

In this embodiment, the configuration information of the CTF may be preconfigured service configuration information. For example, the configuration information may include information such as: the CTF needs to calculate a quota type, and the CTF needs to calculate the number of quota of the quota type.

It can be understood that, if the CTF does not receive any message sent by the PCRF, or the CTF receives a message sent by the PCRF, but the message does not include one or more of the foregoing service unit type and instruction information, the CTF generates a resource quota request according to the configuration information of the CTF. For example, after the trigger condition is met, if the CTF determines that a first message that does not carry the service unit type and is sent by the PCRF is received, the CTF generates, according to the configuration information of the CTF, a resource quota request that is to be sent to the OCS.

That is, in this step, that the CTF executes UD (that is, determines a quota type and number) is determined by the CTF.

In a second application scenario, the foregoing step 101 may include the following content:

101b: After the trigger condition is met, the CTF checks whether a first message that carries a service unit type and/or instruction information and is sent by the PCRF is received.

The service unit type in this step is used to specify a quota type carried, by the CTF, in the generated resource quota request, and the instruction information in this step may be information that is used to instruct the CTF to specify a quota type and number, or the instruction information may be information that is used to instruct the CTF not to specify a quota type or number, or the like.

The foregoing instruction information is instruction information determined by the PCRF according to one or more of parameters such as a service type, a rule configured by an operator, and a package subscribed to by a user.

1) If the CTF determines that a first message that carries a service unit type and instruction information and is sent by the PCRF is received, and the instruction information is information that instructs the CTF to specify a quota type and number, the CTF obtains, according to the service unit type in the first message, a quota type indicated by the service unit type; determines the number of quota of the quota type; and generates a resource quota request according to the service unit type and the number, where the resource quota request includes the quota type indicated by the service unit type and the number of quota of the quota type.

2) If the CTF determines that a first message that carries a service unit type and instruction information and is sent by the PCRF is received, and the instruction information is information that instructs the CTF not to specify a quota type and number, the CTF generates a resource quota request according to the first message, where the resource quota request does not carry a quota type indicated by the service unit type, that is, the resource quota request does not carry a quota type and number.

In a third application scenario, the foregoing step 101 may include the following content:

101c: After the trigger condition is met, the CTF checks whether a first message that carries a service unit type and/or instruction information and is sent by the PCRF is received.

The service unit type in this step is used to specify a quota type carried, by the CTF, in the generated resource quota request, and the instruction information in this step may be information that is used to instruct the CTF to specify a quota type and number, or the instruction information may be information that is used to instruct the CTF not to specify a quota type or number.

If the CTF determines that a first message that carries a service unit type and is sent by the PCRF is received, the CTF determines the number of quota of a quota type according to the service unit type, and generates a resource quota request according to the service unit type and the determined number of quota of the type, where the resource quota request includes the quota type specified by the service unit type and the number of quota of the quota type.

In a fourth application scenario, the foregoing step 101 may include the following content:

101d: After the trigger condition is met, the CTF checks whether a first message that carries a service unit type and/or instruction information and is sent by the PCRF is received.

The service unit type in this step is used to specify a quota type carried, by the CTF, in the generated resource quota request, and the instruction information in this step may be information that is used to instruct the CTF to specify a quota type and number, or the instruction information may be information that is used to instruct the CTF not to specify a quota type or number.

That if the CTF determines that a first message that carries instruction information and is sent by the PCRF is received, the CTF generates a resource quota request according to the instruction information specifically includes:

1) if the instruction information is information that instructs the CTF to specify a quota type and number, the CTF determines a quota type and number according to configuration information of the CTF, and further generates a resource quota request according to the quota type and number, where the resource quota request includes the quota type and number specified by the CTF; and 2) if the instruction information is information that instructs the CTF not to specify a quota type and number, the CTF generates a resource quota request, where the resource quota request does not include a quota type and number.

In an actual application, the first message mentioned in any one of the foregoing scenarios is used to carry a PCC Rule parameter or an ADC Rule parameter. The instruction information is a sub-parameter of the PCC Rule parameter or a sub-parameter of the ADC Rule parameter.

Specially, in an actual application, the instruction information and service unit type in the first message may be combined into one parameter. After receiving the parameter, the CTF determines, according to the parameter, whether the CTF needs to specify a quota type and number. If the CTF needs to specify a quota type and number, the CTF determines a quota type and number according to a value of the parameter, and generates a resource quota request according to the quota type and number, where the resource quota request includes the quota type and number specified by the CTF.

The CTF in the forgoing embodiment may be a PCEF or a traffic detection function (TDF), where the TDF herein includes a deep packet inspection (DPI) capability.

It can be known from the foregoing embodiment that, in the charging control method provided in this embodiment, a service is controlled according to a quota type and number in a quota delivered by an OCS, thereby solving a phenomenon that in the prior art, a charging session fails due to different determining bodies of a quota type, and ensuring correct processing on a charging session.

In another optional application scenario, the charging control method shown in FIG. 2 further includes a step 104 that is not shown in FIG. 2.

104: In a process of monitoring the use of the quota, if the CTF meets a reporting condition, the CTF reports a charging message to the OCS, where the charging message includes use information of the quota, and the like.

In this embodiment, the reporting condition may be: a quota is used up, or the CTF receives a trigger condition that is delivered by the OCS and instructs the CTF to report charging information, such as a Trigger specified by the OCS.

In addition, the use information of the quota is usage information, which is monitored by the CTF, of the quota allocated by the OCS. Specially, if a quota type allocated by the OCS is different from the quota type determined by the CTF, the CTF reports usage information of a quota corresponding to the quota type allocated by the OCS.

In an actual application, a charging message reported by the CTF to the OCS refers to a credit control request (CCR) message that carries a used service unit (USU) parameter and is sent by the CTF to the OCS. The USU parameter herein carries the charging message reported by the CTF to the OCS.

In the charging control method provided in this embodiment, a phenomenon that in the prior art, a charging session fails due to different determining bodies of a quota type is solved, and correct processing on a charging session is ensured.

Figure 3:
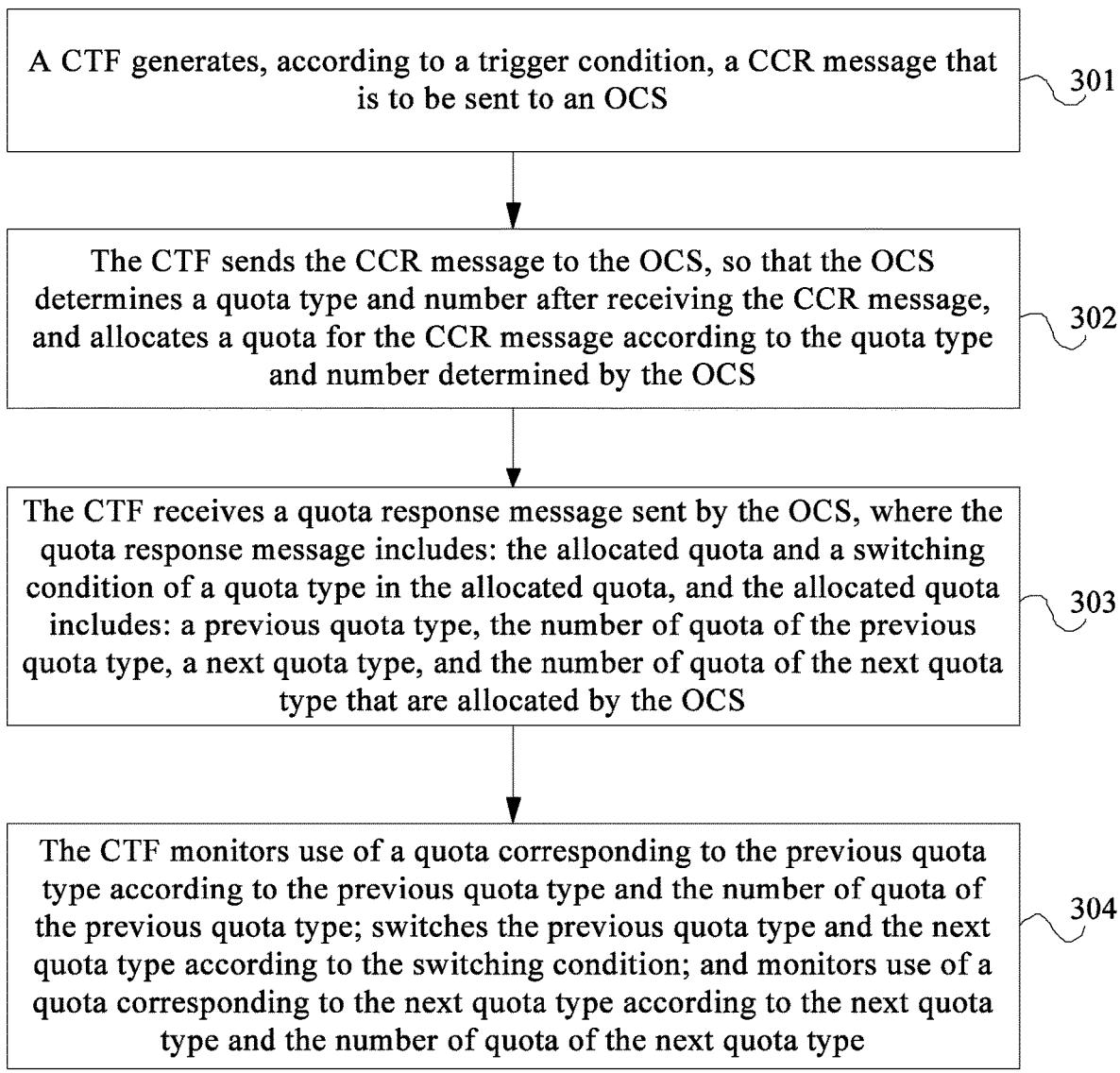
FIG. 3 is a schematic flowchart of a charging control method according to another embodiment of the present disclosure.

FIG. 3 is a schematic flowchart of a charging control method according to another embodiment of the present disclosure. As shown in FIG. 3, the charging control method in this embodiment is described as follows.

301: A CTF generates, according to a trigger condition, a CCR message that is to be sent to an OCS.

Specifically, the trigger condition may be: a service request starts, a quota of a previous service is used up, an existing quota expires, or the like.

It can be understood that, in an actual application, the CCR message may further include a user identifier, service information, and the like. This embodiment is only exemplary description.

302: The CTF sends the CCR message to the OCS, so that the OCS determines a quota type and number after receiving the CCR message, and allocates a quota for the CCR message according to the quota type and number determined by the OCS.

303: The CTF receives a quota response message sent by the OCS, where the quota response message includes: the allocated quota and a switching condition of a quota type in the allocated quota, where the allocated quota includes a previous quota type, the number of quota of the previous quota type (that is, a quota type and number before the switching condition is switched), a next quota type, and the number of quota of the next quota type (that is, a quota type and number after the switching condition is switched) that are allocated by the OCS.

The previous quota type is a quota type before the switching condition of the quota type is met, and the next quota type is a quota type after the switching condition of the quota type is met. In this embodiment, the switching condition of the quota type is used as a reference to distinguish the previous quota type from the next quota type.

The switching condition herein may be a switching time point of the quota type. It should be noted that, switching of the quota type herein means that in the allocated quota, the quota type before the switching condition is switched must be different from the quota type after the switching condition is switched, that is, the previous quota type must be different from the next quota type.

304: The CTF monitors, according to the previous quota type and the number of quota of the previous quota type, use of a quota corresponding to the previous quota type; switches the previous quota type and the next quota type according to the switching condition; and monitors, according to the next quota type and the number of quota of the next quota type, use of a quota corresponding to the next quota type.

The switching the previous quota type and the next quota type according to the switching condition may be: when the switching condition is met, monitoring, by the CTF, use of a quota corresponding to the next quota type.

Certainly, in an exemplary embodiment, the charging control method shown in FIG. 3 further includes the following step 305 that is not shown in FIG. 3.

305: If the CTF collects usage information of the quota corresponding to the previous quota type and usage information of the quota corresponding to the next quota type, the CTF reports, to the OCS, both the usage information of the quota corresponding to the previous quota type and the usage information of the quota corresponding to the next quota type.

The CTF reports, to the OCS, usage information of a quota corresponding to a quota type that is before the switching condition is switched, and usage information of a quota corresponding to a quota type that is after the switching condition is switched, and meanwhile, may further report a switching description of a quota type, where the switching description indicates whether the usage information corresponds to the quota type that is before the switching condition is switched or corresponds to the quota type that is after the switching condition is switched, or the foregoing switching description indicates that the CTF has performed switching of a quota type.

In an actual application, the CTF is further configured to collect service information corresponding to the previous quota type and service information corresponding to the next quota type, so as to report, when reporting usage information of a quota corresponding to the previous quota type to the OCS, service information corresponding to the previous quota type; and report, when reporting usage information of a quota corresponding to the next quota type, service information corresponding to the next quota type.

In the charging control method provided in this embodiment, it may be implemented that, in a charging scenario switching process, a problem that a large amount of signaling is instantaneously generated at a specific time point, thereby exerting an impact on the OCS and CTF can be avoided.

In an exemplary embodiment, on a basis of the charging control method shown in FIG. 1, FIG. 2, and FIG. 3, the charging control method further includes the following step S01 and step S02.

S01: The CTF receives a second message sent by the PCRF, where the second message carries a service unit type.

The second message may be determined by the PCRF according to user subscription information, configuration of an operator, and the like. That is, the PCRF can determine, according to the user subscription information, the configuration of an operator, and the like, that a charging information collection manner needs to be switched, and further update the previously activated PCC Rule parameter or ADC Rule parameter. In an actual application, in the foregoing step S01, except the service unit type in the second message, the second message may further carry other information such as a rating group.

S02: The CTF determines whether a quota type indicated by the service unit type in the second message is consistent with a quota type of a quota with the use currently monitored by the CTF. If the quota type indicated by the service unit type in the second message is consistent with the quota type of the quota with the use currently monitored by the CTF, the CTF continues to execute monitoring the use of the foregoing quota; and if the quota type indicated by the service unit type in the second message is inconsistent with the quota type of the quota with the use currently monitored by the CTF, the CTF updates a use record corresponding to the quota type of a quota with the use currently monitored by the CTF.

That is, the CTF determines whether the service unit type in the second message is consistent with a service unit type of a quota with the use currently monitored by the CTF. If the service unit type in the second message is inconsistent with a service unit type of a quota with the use currently monitored by the CTF, the CTF updates a use record corresponding to the service unit type of a quota with the use currently monitored by the CTF.

For example, the quota type indicated by the service unit type in the second message may be duration, and the quota type of a quota with the use currently monitored by the CTF may be traffic.

In this case, it should be noted that, in an online charging process, if the CTF determines that a reporting granularity for the CTF to report to an OCS includes a rating group and a service identifier (that is, the reporting granularity is the rating group plus the service identifier), the CTF reports the updated use record (that is, a charging message of the quota with the use currently monitored by the CTF) to the OCS.

If the CTF determines that a reporting granularity for the CTF to report to the OCS includes a rating group (that is, the reporting granularity is a rating group level), when updating the use record, the CTF determines whether another service flow uses a quota corresponding to the second message. If no other service flow uses a quota corresponding to the second message, the CTF reports the updated use record to the OCS.

Further, if a quota corresponding to the second message does not exist in the CTF, a quota corresponding to the second message needs to be applied for from the OCS according to the service unit type in the second message.

That is, if the CTF currently already has a quota corresponding to the service unit type in the second message, the CTF does not need to re-apply for a new quota from the OCS according to the service unit type in the second message, and after a quota type on the CTF side is switched, the quota that the CTF already has and corresponds to the service unit type in the second message may be used.

For example, if the second message further carries rating group information, and the CTF currently has a quota corresponding to the rating group information and service unit type, the CTF determines that the quota is the quota corresponding to the second message, and does not need to re-apply for a new quota from the OCS according to the service unit type in the second message. Generally, the second message also carries the rating group information when carrying the service unit type.

The foregoing updated use record that is reported is one of reported charging information. The charging message reported by the CTF herein may be a CCR message carrying a USU parameter, where the USU parameter is used to represent the reported charging message. Further, an RSU parameter may be carried in the CCR message carrying the USU parameter, to apply for a new quota from the OCS. That is, the RSU parameter is used to represent applying for a new quota from the OCS.

Technologies involved in the foregoing embodiment may also be used in an offline charging process. Complete steps in the offline charging process are:

S'01: A CTF receives a second message sent by a PCRF, where the second message carries a service unit type.

The service unit type is used to indicate that the CTF needs to collect, according to the service unit type, use information of a service or service flow specified by the second message.

S'02: The CTF determines whether the service unit type in the second message is consistent with a current service unit type recorded by the CTF. If the service unit type in the second message is inconsistent with a current service unit type recorded by the CTF, the CTF closes a counter corresponding to the currently used service unit type in the CTF, writes information recorded by the counter into a bill, and enables a counter corresponding to the service unit type in the second message, so as to collect use information of a service.

For example, the CTF may use an accounting-request (ACR) message to report collected service use information to an offline charging system, so as to add the service use information in a bill; or the CTF directly adds the collected service use information in a bill, and finally submits the bill to the offline charging system.

In the charging control method in the foregoing embodiment, a problem in a switching process of a charging information collection manner in the prior art can be solved.

Further, in another application scenario, on a basis of the charging control method shown in FIG. 1, FIG. 2, and FIG. 3, the charging control method further includes the following step M01 and step M02.

M01: The CTF receives a third message delivered by the OCS, where the third message instructs the CTF to re-apply for authorization.

The third message may be a re-auth-request (RAR) message.

Specifically, if the OCS determines, according to one or more pieces of information such as service-related information reported by the CTF, user subscription information, or configuration of an operator, that quota type switching needs to be performed, the OCS delivers an RAR message to the CTF, so as to instruct the CTF to report collected charging information and re-apply for a quota, thereby implementing charging control after the quota type switching.

M02: The CTF executes charging reporting and re-applies for authorization. The re-applying for authorization in this step may be as a process of obtaining a quota that is described, as an example, in the step 101 and step 102.

In an actual application, the charging reporting may be: using a CCR message that carries a USU parameter to report, to the OCS, usage information of a quota allocated by the OCS. In addition, the CCR message also carries an RSU parameter to re-apply for an authorized quota.

Certainly, in another embodiment, if the CTF detects that the quota allocated by the CTF is used up, the CTF reports, to the OCS, currently collected charging information, that is, usage information of the quota, and further repeats the process of obtaining a quota that is described, as an example, in the step 101 and step 102.

In an actual application, the foregoing CTF may be a policy and charging execution function (PCEF) module.

For example, if the PCEF detects that an existing quota is used up, or an existing quota expires, in this case, the PCEF reports the currently collected charging information to the OCS, and repeats the foregoing process of obtaining a quota.

In the online charging authorization processing method provided in this embodiment, a problem in a switching process of a charging information collection manner in the prior art can be solved.

Figure 4:
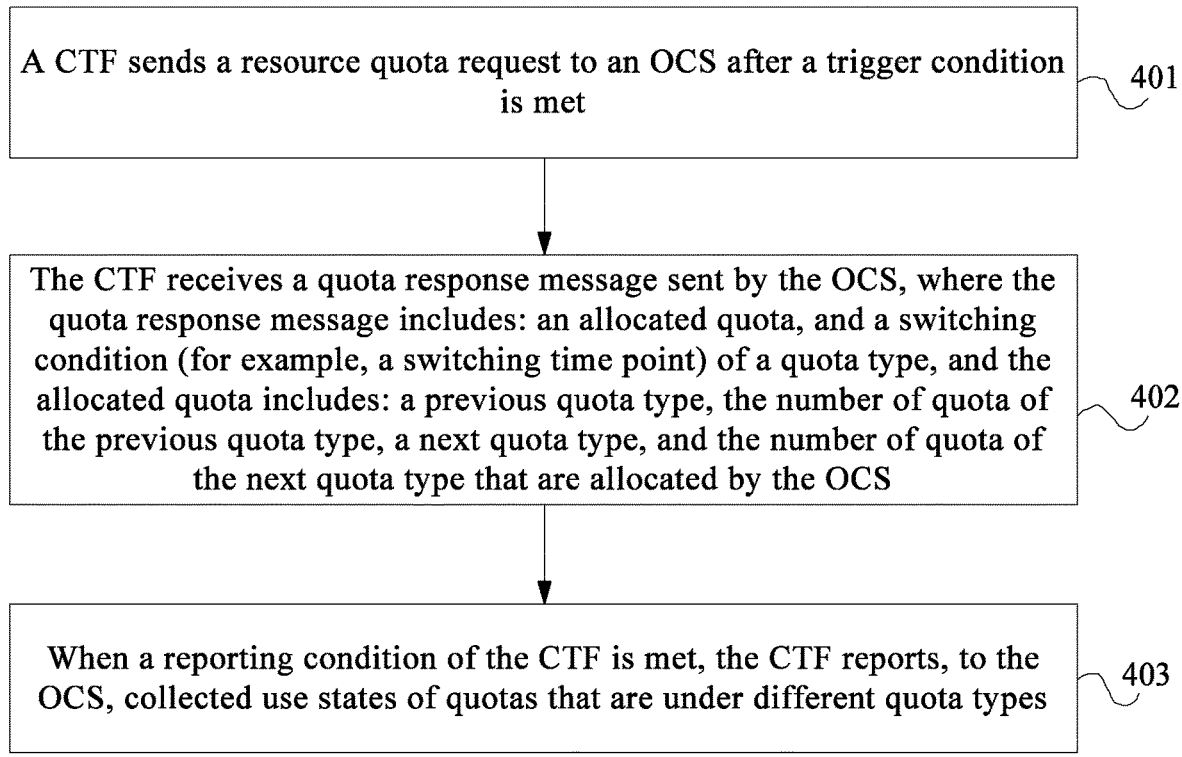
FIG. 4 is a schematic flowchart of a charging control method according to another embodiment of the present disclosure.

FIG. 4 is a schematic flowchart of a charging control method according to another embodiment of the present disclosure. As shown in FIG. 4, the charging control method in this embodiment is described as follows.

Description of this step is a part of the content in FIG. 3. For clearer description, the description is given separately in this embodiment.

Further, to avoid that at a same time point in a charging session, a CTF executes a large number of actions of reporting charging information and re-applying for an authorized quota at a same time point due to switching of a quota type (such as duration and traffic), which causes instantaneous blocking of signaling and an increase in processing pressure of an OCS, when approaching a switching point, the OCS also grants, after receiving a message for applying for quota authorization that is sent by the CTF, a part of a quota that is after the quota type switching, that is, grants both a quota that is before the quota type switching and a quota that is after the quota type switching.

401: A CTF sends a resource quota request to an OCS after a trigger condition is met.

402: The CTF receives a quota response message sent by the OCS, where the quota response message includes: a quota allocated for the resource quota request, and a switching condition (for example, a switching time point) of a quota type in the allocated quota, and the allocated quota includes: a previous quota type, the number of quota of the previous quota type, a next quota type, and the number of quota of the next quota type that are allocated by the OCS.

The previous quota type is a quota type before the switching condition of the quota type is met, and the next quota type is a quota type after the switching condition of the quota type is met.

That is, before the step 402, after receiving the resource quota request, the OCS determines that the switching condition (for example, a switching time point) of the quota type approaches; determines a corresponding quota type and number that are before the switching time point, and a corresponding quota type and number that are after the switching time point; and further allocates a quota for the resource quota request, where the allocated quota includes: a previous quota type, the number of quota of the previous quota type, a next quota type, and the number of quota of the next quota type that are allocated by the OCS.

Specifically, in the step 402, the quota response message may be a CCA message, where a GSU parameter of the CCA message carries a quota allocated/granted by the OCS. One GSU carries information of two quotas. Meanwhile, the message further carries a switching condition of a quota type (for example, a switching time point of the quota type, so as to instruct the CTF to switch, at the switching point of the quota type, use of the quota type).

In another embodiment, the switching condition of the quota type may be carried by using the following manners:

1) Attach a use condition for each quota. Using traffic and duration as an example, the attached use condition may be activation time.

For example, add an activation time parameter CC-Octets-Deferred Active for a traffic quota in a GSU parameter, and add an activation time parameter CC-Time-Deferred Active for a duration quota CC-Time. The GSU parameter after the activation time is added is as follows:

```
Granted-Service-Unit ::= < AVP Header: 431 >
                              [ Tariff-Time-Change ]
                              [ CC-Time ]
                              [ CC-Time-DeferredActive]
                              [ CC-Money ]
                              [ CC-Total-Octets ]
                              [ CC-Input-Octets ]
                              [ CC-Output-Octets ]
                              [ CC-Octets-DeferredActive]
                              [ CC-Service-Specific-Units ]
                              *[ AVP ]
```

2) Specify a switching condition for two quotas in a GSU, where the switching condition may be a switching time point.

For example, an AVP (for example, Unit-Type-Change) may be added in the GSU to indicate switching of a granted quota, or a Tariff-Time-Change AVP may be reused, where the AVP previously specifies rating group switching, and the meaning is extended herein, and the AVP is used to further notify a CTF that the two quotas in the GSU are switched at a certain time point for use.

Certainly, in an actual application, if the Tariff-Time-Change AVP is reused, there may be a scenario in which both rating group switching and quota type switching need to be indicated (for example, switching time points of the rating group switching and the quota type switching are close, but are not the same). In this case, the rating group switching may conflict with the quota type switching. To avoid conflict, the AVP is still used to indicate the rating group switching, and an OCS grants only a quota corresponding to a quota type that is before the switching time point, and specifies that an effective period of the quota corresponding to a quota type that is before the switching time point extends to the switching time point of the quota type, so that the CTF can re-apply for, at the switching time point, a quota corresponding to a quota type that is after the switching time point from the OCS.

In this method, because there is only one switching time point, the CTF needs to determine use description of quotas corresponding to two quota types. For example, the following manners may be used to determine that, a quota corresponding to which quota type is respectively used before or after the switching time point.

Manner 1: The OCS does not specify, in the GSU, which quota is used before the switching time point. The CTF determines a quota that is before the switching time point according to a quota type corresponding to a quota previously used by a service, and uses a quota corresponding to another quota type after the switching time point specified in the GSU. It should be noted that, a quota delivered by the OCS herein includes only two quota types, and the OCS does not specify, in the GSU, which quota is used before the switching time point. In this case, the CTF can perform execution according to Manner 1.

Manner 2: Before the switching time point and after the switching time point, the CTF monitors and collects usage information of quotas corresponding to two quota types, and reports to the OCS when a reporting condition is met. The OCS extracts a corresponding quota usage information according to a quota type that is before the switching time point and a quota type that is after the switching point, and performs charging processing.

Manner 3: The OCS clearly specifies, in the GSU, which quota is used before the switching time point. The CTF determines, according to the specification, quotas that are respectively used before the switching time point and after the switching time point. To specify which quota is used before the switching time point, a new AVP, for example, Unit-Type-Before, may be added in a response message delivered by the OCS, to indicate a quota corresponding to a quota type that is before the switching time point.

After receiving the quota allocated by the OCS, the CTF monitors use of the quota according to the quota in the CCA and a switching condition of a quota type of the quota. For example, the CTF monitors and collects usage information of a quota corresponding to a quota type that is before the switching condition is switched, and usage information of a quota corresponding to a quota type that is after the switching condition is switched.

403: When a reporting condition of the CTF is met, the CTF reports, to the OCS, collected usage information of quotas that are under different quota types.

If the CTF collects both usage information of quotas that are before the switching time point and after the switching time point of the quota type, the CTF uses, in the CCR (in a CCR message), two USUs to respectively report the usage information of the quotas that are before the switching time point of the quota type and after the switching time point of the quota type.

After receiving quota use information reported by the CTF, the OCS first distinguishes which is use information that is before the switching time point of the quota type, and which is use information that is after the switching time point of the quota type. Specifically, there are the following two methods:

Method 1: The OCS identifies, according to types of the quotas in the two USUs that are reported and the quota type switching condition determined by the OCS, quota use information carried by which USU is before the quota type switching condition is switched, and quota use information carried by which USU is after the quota type switching condition is switched.

Method 2: The CTF specifies, in the reported quota use information, which use information is use information that is before the quota type switching condition is switched, and which is after the quota type switching condition is switched. Specifically, an AVP (for example, Unit-Type-Usage) is used for the specification, where the AVP is carried in the two reported USUs, and a value of the AVP indicates whether the use information is before the quota type switching condition is switched or after the quota type switching condition is switched.

In the foregoing embodiment, a PCRF or an OCS is used as a switching condition of duration and traffic of a same charging session, re-authorization is triggered when a determined switching condition is met, and further, a charging mode for traffic and duration switching is implemented in a charging session process. Further, both a traffic quota and a duration quota are delivered by using an OCS, and a switching condition of a quota type is delivered, so as to reduce a signaling impact on the OCS and a CTF when a condition is switched, and improve system reliability and stability.

Figure 5:
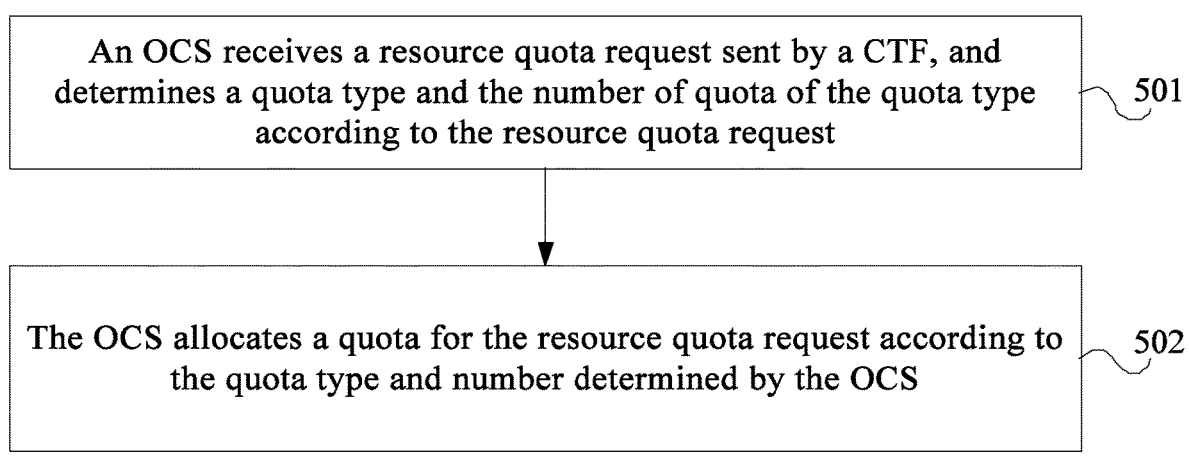
FIG. 5 is a schematic flowchart of a charging control method according to another embodiment of the present disclosure.

FIG. 5 is a schematic flowchart of a charging control method according to another embodiment of the present disclosure. As shown in FIG. 5, the charging control method in this embodiment is described as follows.

501: An OCS receives a resource quota request sent by a CTF, and determines a quota type and the number of quota of the quota type according to the resource quota request.

502: The OCS allocates a quota for the resource quota request according to the quota type and number determined by the OCS.

Further, in the step 501, the determining a quota type and the number of quota of the quota type according to the resource quota request specifically includes:

determining, according to the resource quota request, a switching condition of the quota type, a previous quota type, the number of quota the previous quota type, a next quota type, and the number of quota the next quota type; where:

the previous quota type is a quota type before the switching condition of the quota type is met, and the next quota type is a quota type after the switching condition of the quota type is met; and correspondingly, the step 502 may specifically includes:

allocating a first quota for the resource quota request according to the previous quota type and the number of quota the previous quota type, and allocating a second quota for the resource quota request according to the next quota type and the number of quota the next quota type, so that the CTF controls a service by using a quota type in the first quota, and monitors use of the first quota; and when the switching condition is met, controls the service by using a quota type in the second quota, and monitors use of the second quota.

In an actual application, the charging control method shown in FIG. 5 may further include the following step 503 or step 503' that is not shown in the diagram.

503: The OCS sends a response message to the CTF, where the response message includes the quota allocated for the resource quota request, so that the CTF controls a service according to the quota, and monitors use of the quota.

503': The OCS sends a quota response message to the CTF, where the quota response message includes the allocated quota and the switching condition of the quota type, and the allocated quota includes the first quota and the second quota, so that the CTF controls a service by using a quota type in the first quota, and monitors use of the first quota; and when the switching condition is met, performs switching and controls the service by using a quota type in the second quota, and monitors use of the second quota.

That the CTF monitors use of the first quota may be understood as that the CTF controls a service by using a quota type in the first quota.

Certainly, after the step 503', the charging control method may further include the following step 504 that is not shown in the diagram.

504: The OCS receives use information reported by the CTF, where the use information includes usage information of the first quota and usage information of the second quota; and performs charging processing according to the use information.

In an actual application, the OCS receives use information reported by the CTF, where the use information includes usage information of the first quota, usage information of the second quota, a quota type corresponding to the first quota, and a quota type corresponding to the second quota; and performs charging processing according to the use information.

In the charging control method provided in this embodiment, a problem that in the prior art, a charging session fails due to different determining bodies of a quota type is solved, and correct processing on a charging session is ensured.

According to another aspect of the present disclosure, the present disclosure further provides a charging control method, where the charging control method includes:

sending, by a PCRF, a first message that includes a service unit type to a CTF, or sending a first message that includes instruction information, or sending a first message that includes the service unit type and the instruction information, so that the CTF generates a resource quota request according to the first message; where:

the service unit type is used to indicate a quota type carried, by the CTF, in the generated resource quota request, or is used to indicate that the CTF needs to collect, according to the service unit type, use information of a service or service flow specified by the second message; and the instruction information may be information that instructs the CTF to specify a quota type and number, or the instruction information may be information that instructs the CTF not to specify a quota type and number.

In another embodiment, as shown in FIG. 6, the charging control method may include:

601: A PCRF sends a first message that includes a service unit type to a CTF, or sends a first message that includes instruction information, or sends a first message that includes the service unit type and the instruction information, so that the CTF generates a resource quota request according to the first message.

602: The PCRF sends a second message that includes a service unit type to the CTF, so that the CTF determines whether the service unit type in the second message is consistent with a service unit type of a quota with the use currently monitored by the CTF, and if the service unit type in the second message is inconsistent with a service unit type of a quota with the use currently monitored by the CTF, updates and reports a use record.

In the charging control method provided in this embodiment, a problem that in the prior art, a charging session fails due to different determining bodies of a quota type is solved, and correct processing on a charging session is ensured.

According to another aspect of the present disclosure, the present disclosure further provides a charging trigger apparatus. As shown in FIG. 7, the charging trigger apparatus in this embodiment includes: a generating unit 71 and a sending unit 72.

The generating unit 71 is configured to generate a resource quota request according to a trigger condition; and the sending unit 72 sends the resource quota request to an online charging system OCS, so that the OCS determines a quota type and the number of quota of the quota type after receiving the resource quota request, and allocates a quota for the resource quota request according to the quota type and number determined by the OCS; where:

the quota type and number are determined by the OCS according to the resource quota request.

Specially, the generating unit 71 is specifically configured to: after the trigger condition is met, if it is determined that a first message the carries a service unit type and is sent by a PCRF is received, where the service unit type is used to indicate a quota type carried, by the CTF, in the generated resource quota request, determine the number of quota of the quota type according to the service unit type; and generate a resource quota request according to the service unit type and the number, where the resource quota request includes the quota type indicated by the service unit type and the number of quota of the quota type;

or, after the trigger condition is met, if it is determined that a first message that does not carry a service unit type and is sent by a PCRF is received, generate, according to configuration information of the CTF, a resource quota request that is to be sent to the OCS.

In an application scenario, the generating unit 71 is further configured to: after the trigger condition is met, if it is determined that a first message that carries a service unit type and instruction information and is sent by a PCRF is received, where the service unit type is used to indicate a quota type carried, by the CTF, in the generated resource quota request, and the instruction information is information that instructs the CTF to specify a quota type and number, or the instruction information is information that instructs the CTF not to specify a quota type and number, determine, according to the instruction information, whether a quota type and number need to be specified. Specifically, if the instruction information is information that instructs the CTF to specify a quota type and number, obtain, according to the service unit type, the quota type indicated by the service unit type, determine the number of quota of the quota type, and generate a resource quota request according to the service unit type and the number, where the resource quota request includes the quota type indicated by the service unit type and the number of quota of the quota type; and if the instruction information is information that instructs the CTF not to specify a quota type and number, generate a resource quota request that is to be sent to the OCS, where the resource quota request does not carry the quota type indicated by the service unit type.

In another application scenario, the generating unit 71 is further configured to: after the trigger condition is met, if it is determined that a first message that carries instruction information and is sent by a PCRF is received, where the instruction information is information that instructs the CTF to specify a quota type and number, or the instruction information is information that instructs the CTF not to specify a quota type and number, determine, according to the instruction information, whether a quota type and number need to be determined. Specifically, if the instruction information is information that instructs the CTF to specify a quota type and number, specify a quota type according to configuration information of the CTF, determine the number of quota of the quota type, and generate a resource quota request according to the quota type and the number, where the resource quota request includes the quota type specified by the CTF and the number of quota of the quota type; and if the instruction information is information that instructs the CTF not to specify a quota type and number, generate a resource quota request that is to be sent to the OCS, where the resource quota request does not carry a quota type.

Figure 8:
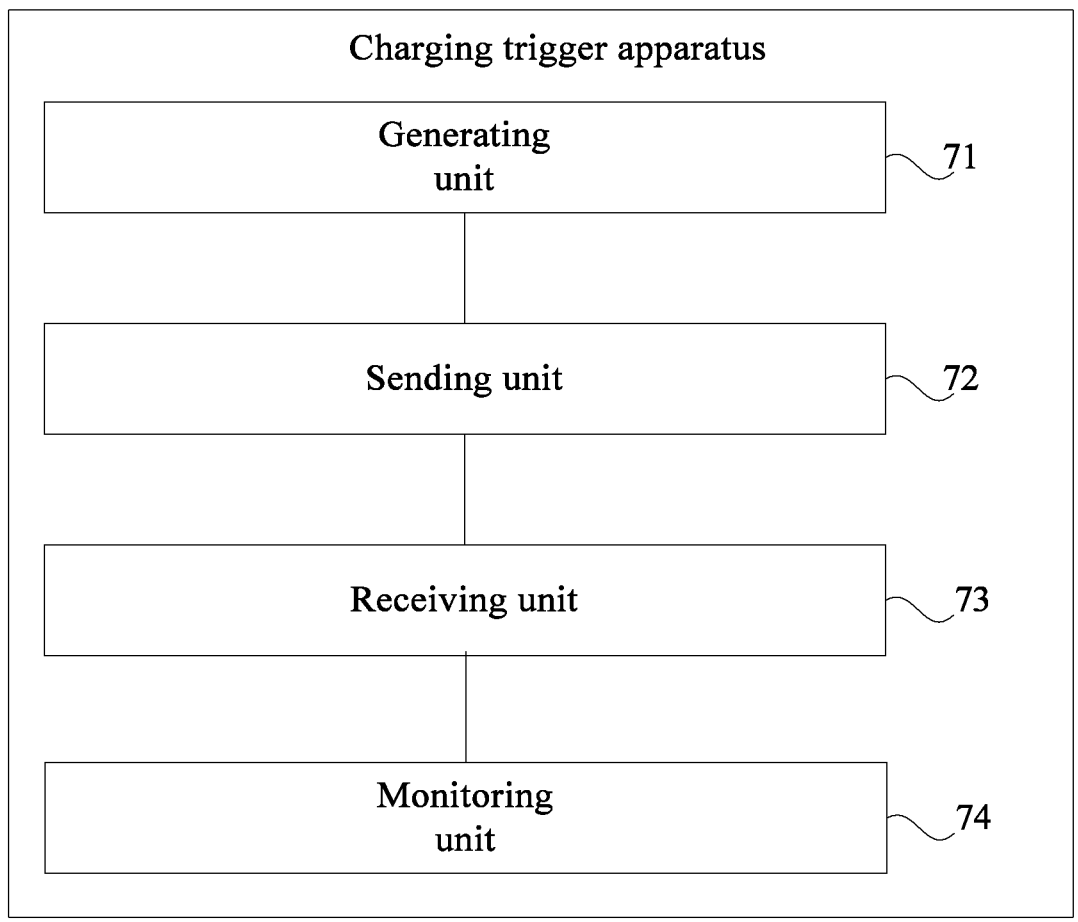
FIG. 8 is a schematic structural diagram of a charging trigger apparatus according to another embodiment of the present disclosure.

Optionally, as shown in FIG. 8, the charging trigger apparatus further includes: a receiving unit 73, configured to receive a response message sent by the OCS, where the response message includes the quota allocated for the resource quota request; and a monitoring unit 74, configured to control a service according to the quota allocated by the OCS, and monitor use of the quota.

Certainly, in another exemplary application scenario, the receiving unit 73 is further configured to receive a second message sent by the PCRF, where the second message carries a service unit type; and in this case, the charging trigger apparatus further includes: a determining unit (which is not shown in the diagram), where the determining unit is configured to determine whether the service unit type in the second message is consistent with a service unit type of a quota with the use currently monitored by the CTF; and if the service unit type in the second message is inconsistent with a service unit type of a quota with the use currently monitored by the CTF, the CTF updates a use record corresponding to the service unit type of a quota with the use currently monitored by the CTF.

In addition, in an actual application, when the charging trigger apparatus is in an online charging process, the charging trigger apparatus further includes a reporting unit (which is not shown in the diagram), where the reporting unit is configured to: when the determining unit determines that a reporting granularity for the CTF to report to the OCS includes a rating group and a service identifier, report the updated use record to the OCS; and if the determining unit determines that a reporting granularity for the CTF to report to the OCS includes a rating group, when the CTF updates the use record, determine at the same time whether another service flow uses a quota corresponding to the second message; and if no other service flow uses a quota corresponding to the second message, report the updated use record to the OCS;

in addition, if the determining unit determines that a quota corresponding to the second message does not exist in the CTF, apply for a quota corresponding to the second message from the OCS according to the service unit type in the second message.

In another application scenario, the receiving unit 73 of the charging trigger apparatus may be specifically configured to receive a quota response message sent by the OCS, where the quota response message includes: the quota allocated for the resource quota request, and a switching condition of a quota type; where:

the allocated quota includes a previous quota type, the number of quota of the previous quota type, a next quota type, and the number of quota of the next quota type that are allocated by the OCS; and correspondingly, the monitoring unit 74 is configured to monitor use of a quota corresponding to the previous quota type according to the previous quota type and the number of quota of the previous quota type; switch the previous quota type and the next quota type according to the switching condition; and monitor use of a quota corresponding to the next quota type according to the next quota type and the number of quota of the next quota type; where:

the previous quota type is a quota type before the switching condition of the quota type is met, and the next quota type is a quota type after the switching condition of the quota type is met.

Certainly, if the charging trigger apparatus is in an online charging process, the reporting unit of the charging trigger apparatus may be specifically configured to: if service information and quota usage information of the previous quota type, and service information and quota usage information of the next quota type are collected, the CTF reports both the usage information of the quota corresponding to the previous quota type and the usage information of the quota corresponding to the next quota type.

The charging trigger apparatus controls a service according to a quota type of the quota allocated by the OCS, and monitors use of the quota, which can effectively solve a problem that in the prior art, determining bodies of a quota type conflict.

Figure 9:
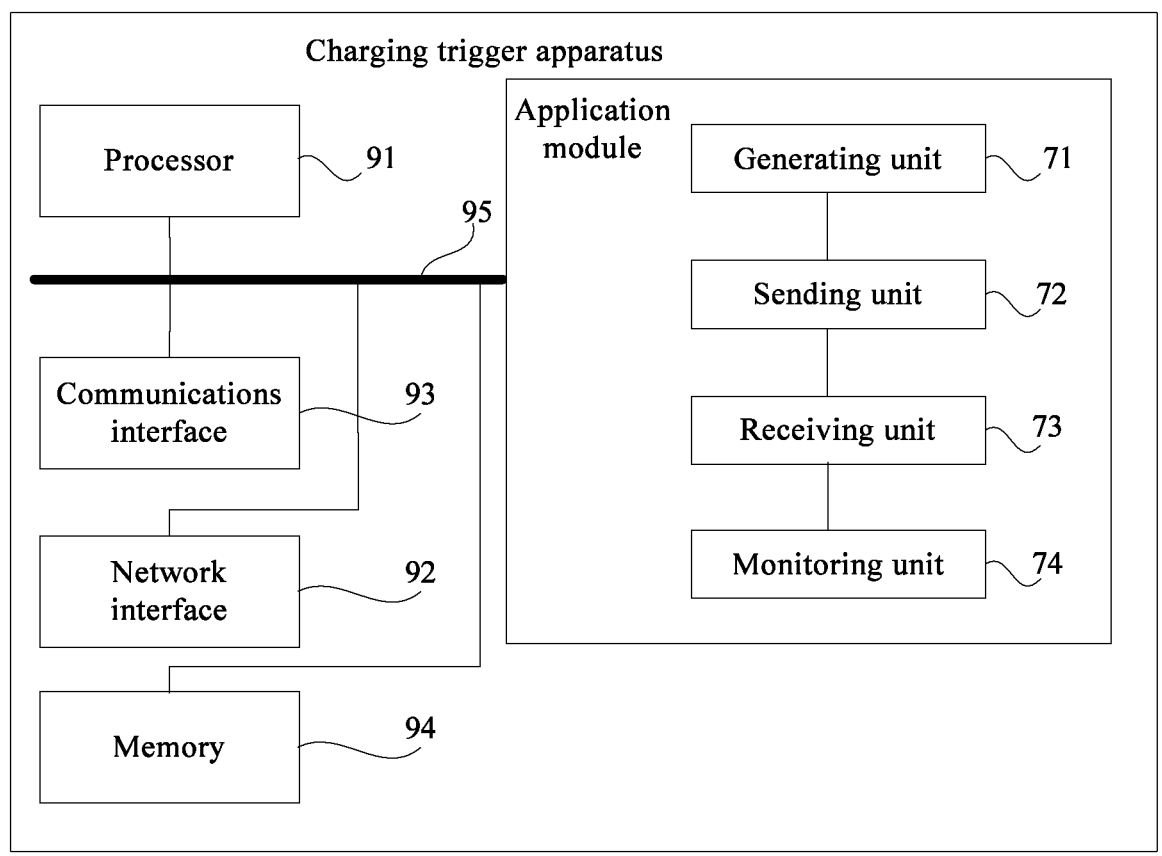
FIG. 9 is a schematic structural diagram of a charging trigger apparatus according to another embodiment of the present disclosure.

FIG. 9 is a schematic structural diagram of a charging trigger apparatus according to another embodiment of the present disclosure. The charging trigger apparatus in this embodiment includes: at least one processor 91, at least one network interface 92, another communications interface 93, a memory 94, and at least one communications bus 95, where the communications bus 95 is configured to implement communications connections between the foregoing units, for example, the processor 91 is connected to the communications bus 95, and the network interface 92 and the communications interface both are connected to the communications bus 95.

The foregoing processor 91 may be connected to an application module, where the application module may include one or a combination of the following units: a generating unit 71, a sending unit 72, a receiving unit 73, a monitoring unit 74, a reporting unit, a determining unit, and the like. For functions of the foregoing units, reference may be made to related description in FIG. 7 or FIG. 8, and details are not repeatedly described in this embodiment.

Alternatively, in another embodiment, the processor 91 is configured to implement functions that are implemented by the generating unit 71 and the sending unit 72 that are described, as an example, in the FIG. 7; and is configured to implement functions of the generating unit 71, the sending unit 72, the receiving unit 73, and the monitoring unit 74 that are described, as an example, in FIG. 8, and functions of the reporting unit and the determining unit that are not shown in FIG. 8.

Figure 10:
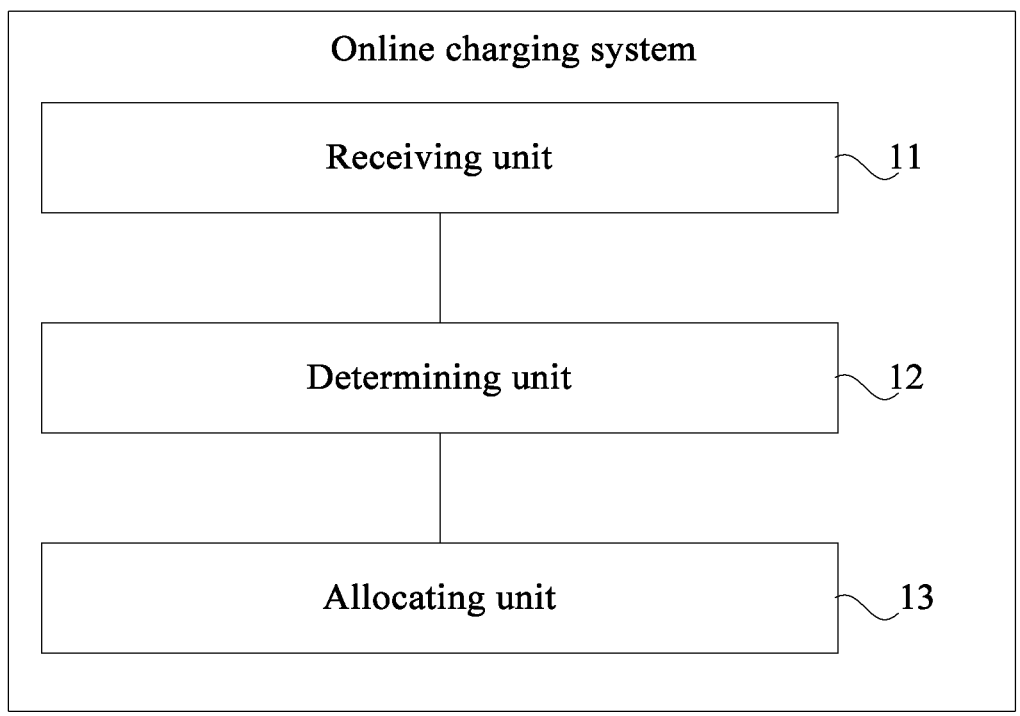
FIG. 10 is a schematic structural diagram of an online charging system according to an embodiment of the present disclosure.

FIG. 10 is a schematic structural diagram of an online charging system according to another embodiment of the present disclosure. The online charging system in this embodiment includes: a receiving unit 11, a determining unit 12, and an allocating unit 13.

The receiving unit 11 is configured to receive a resource quota request sent by a charging trigger apparatus CTF;

the determining unit 12 is configured to determine a quota type and the number of quota of the quota type according to the resource quota request; and the allocating unit 13 is configured to allocate a quota for the resource quota request according to the quota type and number determined by an Online Charging System.

Optionally, the determining unit 12 is further configured to determine, according to the resource quota request, a switching condition of the quota type, a previous quota type, the number of quota of the previous quota type, a next quota type, and the number of quota of the next quota type; where:

the previous quota type is a quota type before the switching condition of the quota type is met, and the next quota type is a quota type after the switching condition of the quota type is met; and correspondingly, the allocating unit 13 is further configured to allocate a first quota for the resource quota request according to the previous quota type and the number of quota of the previous quota type, and allocate a second quota for the resource quota request according to the next quota type and the number of quota of the next quota type.

In an application scenario, the foregoing online charging system further includes: a sending unit (which is not shown in the diagram), configured to send a quota response message to the CTF, where the quota response message includes an allocated quota and a switching condition of the quota type, and the allocated quota includes the first quota and the second quota, so that the CTF monitors use of the first quota, and when the switching condition is met, performs switching and monitors use of the second quota.

In another application scenario, the receiving unit 11 in the foregoing online charging system is further configured to receive use information reported by the CTF, where the use information includes usage information of the first quota and usage information of the second quota; and perform charging processing according to the use information.

In the online charging system provided in this embodiment, a phenomenon that in the prior art, a charging session fails due to different determining bodies of a quota type is solved, and correct processing on a charging session is ensured.

Further, a signaling impact of applying for, by a CTF, when a condition is switched, a new quota on the OCS is reduced, and system reliability and stability are improved.

Figure 11:
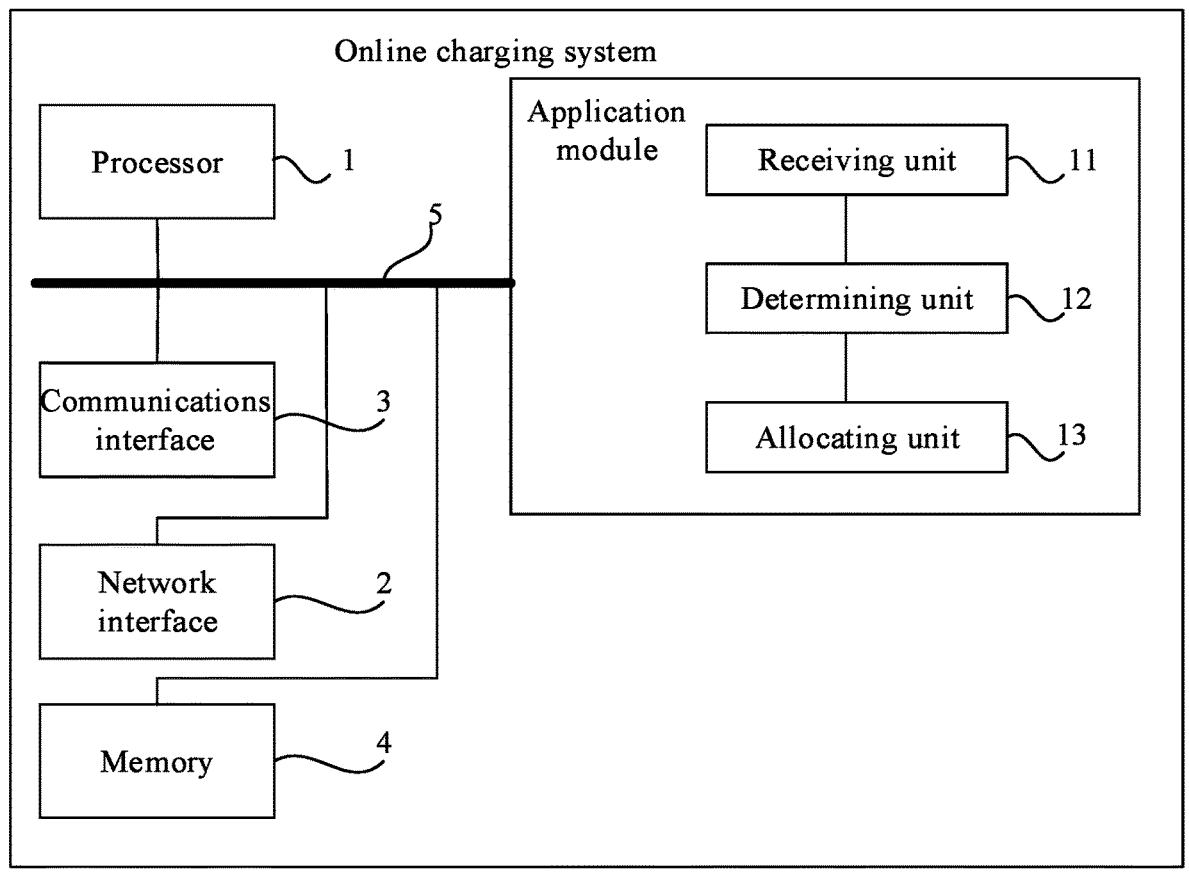
FIG. 11 is a schematic structural diagram of an online charging system according to another embodiment of the present disclosure.

FIG. 11 is a schematic structural diagram of an online charging system according to another embodiment of the present disclosure. The online charging system in this embodiment includes: at least one processor 1, at least one network interface 2, another communications interface 3, a memory 4, and at least one communications bus 5, where the communications bus 5 is configured to implement communications connections between the foregoing units, for example, the processor 1 is connected to the communications bus 5, and the network interface 2 and the communications interface both are connected to the communications bus 5.

The processor 1 may be connected to an application module, where the application module may include one or a combination of the following units: a receiving unit 11, a determining unit 12, an allocating unit 13, a sending unit, and the like. For functions of the foregoing units, reference may be made to related description in FIG. 10, and details are not repeatedly described in this embodiment.

Alternatively, in another embodiment, the processor 1 may be configured to implement functions of the receiving unit 11, the determining unit 12, the allocating unit 13, the sending unit, and the like that are described, as an example, in FIG. 10.

In the online charging system in this embodiment, a phenomenon that in the prior art, a charging session fails due to different determining bodies of a quota type is solved, and correct processing on a charging session is ensured. Further, a signaling impact of applying for, by a CTF, when a condition is switched, a new quota on the OCS is reduced, and system reliability and stability are improved.

Figure 12:
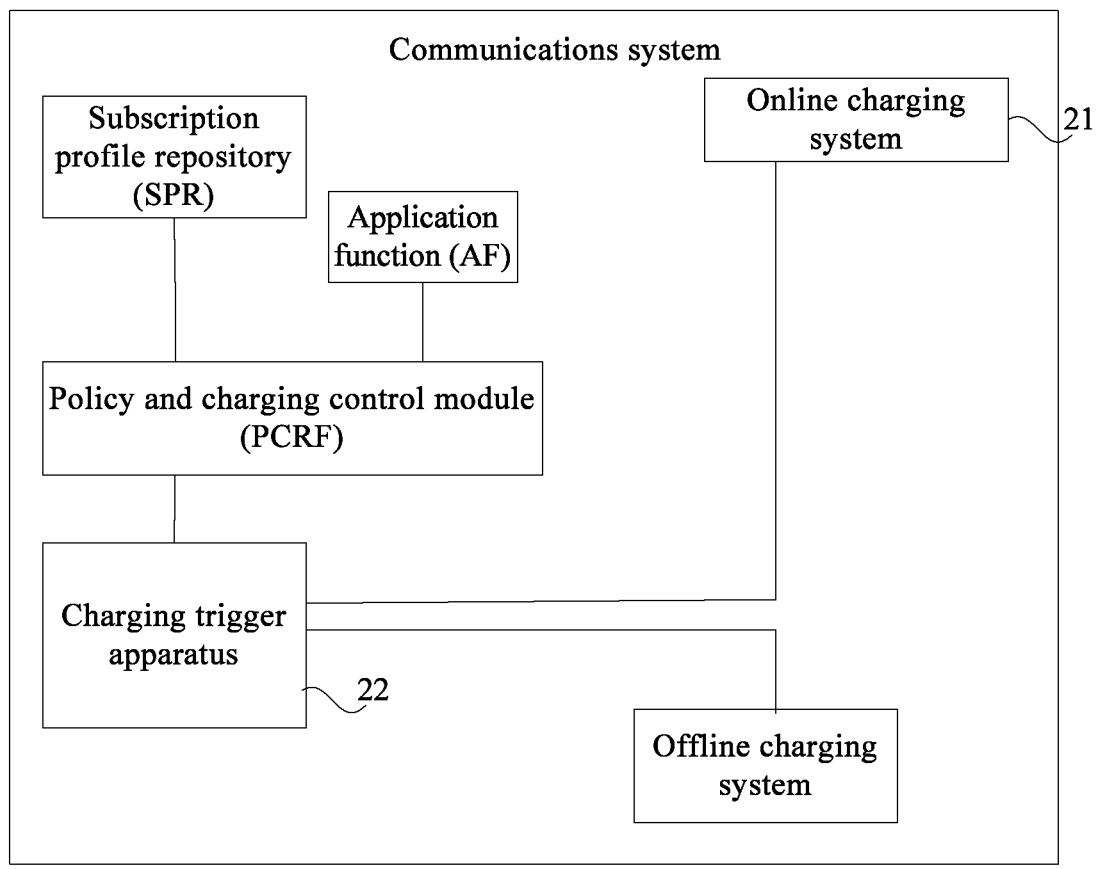
FIG. 12 is a network architecture diagram of a communications system according to an embodiment of the present disclosure.

FIG. 12 is a network architecture diagram of a communications system to which an online charging system and a charging trigger apparatus are applicable. The communications system in this embodiment includes: an online charging system 21 and a charging trigger apparatus 22.

In an actual application, the communications system may further include a PCRF, and the like. For example, the PCRF delivers, to the charging trigger apparatus, the first message, the second message, and/or the third message that are described, as an example, in the foregoing method embodiments.

For a specific implementation manner of the online charging system 21, the charging trigger apparatus 22, and the PCRF, reference may be made to other apparatus or method embodiments of the present disclosure, and details are not repeatedly described herein. Persons of ordinary skill in the art should understand that, in the communications system provided in the embodiment of the present disclosure, because the online charging system and the charging trigger apparatus provided in the embodiments of the present disclosure are used, effective effects brought by the online charging system and the charging trigger apparatus provided in the embodiments of the present disclosure can be achieved.

Persons of ordinary skill in the art may understand that all or a part of the steps of the foregoing method embodiments may be implemented by a program instructing relevant hardware. The program may be stored in a computer readable storage medium. When the program runs, the steps of the foregoing method embodiments are performed. The foregoing storage medium includes: any medium that can store program code, such as a ROM, a RAM, a magnetic disk, or an optical disk.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to a part of or all technical features of the technical solutions described in the foregoing embodiments; however, these modifications or replacements do not make the essence of the corresponding technical solutions depart from the scope of the technical solutions of the embodiments of the present disclosure.

What is claimed is:

1. A method for allocating a chargeable service resource to a user terminal, comprising:
   sending, by a policy control apparatus of a communication system, to a charging trigger function apparatus of the communication system, a first message, wherein the first message carries a first unit type to be used to measure a chargeable service resource allocated to the user terminal;
   determining, by the charging trigger function apparatus according to the first unit type, a first quantity of units of the chargeable service resource to be requested from an online charging system of the communication system;
   sending, by the charging trigger function apparatus, a first credit request to the online charging system, wherein the first credit request comprises the first unit type and the first quantity of units of the chargeable service resource; and
   receiving, by the charging trigger function apparatus, a first credit response from the online charging system, wherein the first credit response carries the first quantity of units of the chargeable service resource allocated to the user terminal.

2. The method according to claim 1, further comprising:
   monitoring, by the charging trigger function apparatus, usage of the allocated chargeable service resource by the user terminal.

3. The method according to claim 1, further comprising:
   sending, by the charging trigger function apparatus, a second message to the policy control apparatus, wherein the second message carries a second unit type to be used to measure the chargeable service resource allocated to the user terminal;
   determining, by the charging trigger function apparatus according to the second unit type, a second quantity of units of the chargeable service resource to be requested from the online charging system;
   sending, by the charging trigger function apparatus, a second credit request to the online charging system, wherein the second credit request comprises the second unit type and the second quantity of units of the chargeable service resource requested from the online charging system; and
   receiving, by the charging trigger function apparatus, a second credit response from the online charging system, wherein the second credit response carries the second quantity of units of the chargeable service resource allocated to the user terminal.

4. The method according to claim 3, further comprising:
when the second unit type in the second message is different from the first unit type in the first message, updating, by the charging trigger function apparatus, a resource usage record of the user terminal.

5. The method according to claim 4, further comprising:
reporting, by the charging trigger function apparatus, the updated resource usage record of the user terminal to the online charging system.

6. The method according to claim 4, further comprising:
determining, by the charging trigger function apparatus, whether to report the updated resource usage record of the user terminal to the online charging system based on a preset reporting granularity; and
when the preset reporting granularity comprises a rating group and a service identifier, reporting, by the charging trigger function apparatus, the updated resource usage record of the user terminal to the online charging system.

7. The method according to claim 4, further comprising:
determining, by the charging trigger function apparatus, whether to report the updated resource usage record of the user terminal to the online charging system based on a preset reporting granularity;
when the preset reporting granularity comprises a rating group, determining, by the charging trigger function apparatus when the resource usage record of the user terminal is updated, whether there is another service flow of the user terminal that is using the second quantity of units of the chargeable service resource allocated to the user terminal; and
reporting, by the charging trigger function apparatus, the updated resource usage record of the user terminal to the online charging system when there is no other service flow of the user terminal that is using the second quantity of units of the chargeable service resource allocated to the user terminal.

8. The method according to claim 3, further comprising:
recording, by the charging trigger function apparatus, usage of the first quantity of units of the allocated chargeable service resource by the user terminal; and
when the usage of the first quantity of units of the allocated chargeable service resource reaches a preset switch condition, switching to record, by the charging trigger function apparatus, usage of the second quantity of units of the allocated chargeable service resource by the user terminal.

9. The method according to claim 8, further comprising:
reporting, by the charging trigger function apparatus to the online charging system, the usage of the first quantity of units of the allocated chargeable service resource and the usage of the second quantity of units of the allocated chargeable service resource by the user terminal.

10. The method according to claim 1, further comprising:
allocating, by the online charging system, the first quantity of units of the chargeable service resource to the user terminal after the first credit request is received.

11. A charging trigger function apparatus in a communication system comprising:
at least one processor, at least one communication interface, and a memory for storing program codes;
wherein the program codes, when executed by the processor, cause the charging trigger function apparatus to:

receive a first message from a policy control apparatus of the communication system, wherein the first message carries a first unit type to be used to measure a chargeable service resource allocated to a user terminal that receives a service from the communication system;
determine a first quantity of units of the chargeable service resource to be requested from an online charging system of the communication system according to the first unit type carried in the first message;
send a first credit request to the online charging system, wherein the first credit request comprises the first unit type and the first quantity of the chargeable service resource; and
receive a first credit response from the online charging system, wherein the first credit response carries the first quantity of units of the chargeable service resource allocated to the user terminal.

12. The charging trigger function apparatus according to claim 11, wherein the program codes further cause the charging trigger function apparatus to:
monitor usage of the allocated chargeable service resource by the user terminal.

13. The charging trigger function apparatus according to claim 11, wherein the program codes further cause the charging trigger function apparatus to:
receive a second message from the policy control apparatus, wherein the second message carries a second unit type to be used to measure the chargeable service resource allocated to the user terminal;
determine, according to the second unit type, a second quantity of units of the chargeable service resource to be requested from the online charging system;
send a second credit request to the online charging system, wherein the second credit request comprises the second unit type and the second quantity of units of the chargeable service resource requested from the online charging system; and
receive a second credit response from the online charging system, wherein the second credit response carries the second quantity of units of the chargeable service resource allocated to the user terminal.

14. The charging trigger function apparatus according to claim 13, wherein the program codes further cause the charging trigger function apparatus to:
update a resource usage record of the user terminal when the second unit type in the second message is different from the first unit type in the first message.

15. The charging trigger function apparatus according to claim 14, wherein the program codes further cause the charging trigger function apparatus to:
report the updated resource usage record of the user terminal to the online charging system.

16. The charging trigger function apparatus according to claim 14, wherein the program codes further cause the charging trigger function apparatus to:
determine whether to report the updated resource usage record of the user terminal to the online charging system based on a preset reporting granularity; and
when the preset reporting granularity comprises a rating group and a service identifier, report the updated resource usage record of the user terminal to the online charging system.

17. The charging trigger function apparatus according to claim 14, wherein the program codes further cause the charging trigger function apparatus to:

determine whether to report the updated resource usage record of the user terminal to the online charging system based on a preset reporting granularity;

when the preset reporting granularity comprises a rating group, determine, when the resource usage record of the user terminal is updated, whether there is another service flow of the user terminal that is using the second quantity of units of the chargeable service resource allocated to the user terminal; and report the updated resource usage record of the user terminal to the online charging system when there is no other service flow of the user terminal that is using the second quantity of units of the chargeable service resource allocated to the user terminal.

18. The charging trigger function apparatus according to claim 13, wherein the program codes further cause the charging trigger function apparatus to:

record usage of the first quantity of units of the allocated chargeable service resource by the user terminal; and when the usage of the first quantity of units of the allocated chargeable service resource reaches a preset switch condition, switch to record usage of the second quantity of units of the allocated chargeable service resource by the user terminal.

19. The charging trigger function apparatus according to claim 18, wherein the program codes further cause the charging trigger function apparatus to:

report to the online charging system the usage of the first quantity of units of the allocated chargeable service resource and the usage of the second quantity of units of the allocated chargeable service resource by the user terminal.

20. A communication system, comprising:

a charging trigger function apparatus, a policy control apparatus, and an online charging system;

wherein the charging trigger function apparatus is configured to:

receive a first message from the policy control apparatus, wherein the first message carries a first unit type to be used to measure a chargeable service resource allocated to a user terminal that receives a service from the communication system;

determine a first quantity of units of the chargeable service resource to be requested from the online charging system according to the first unit type;

send a first credit request to the online charging system, wherein the first credit request comprises the first unit type and the first quantity of units of the chargeable service resource; and receive a first credit response from the online charging system, wherein the first credit response carries the first quantity of units of the chargeable service resource allocated to the user terminal.

21. The communication system according to the claim 20, wherein the online charging system is configured to:

allocate the first quantity of units of the chargeable service resource to the user terminal after the first credit request is received.

22. The communication system according to the claim 20, wherein the charging trigger function apparatus is further configured to:

receive a second message from the policy control apparatus, wherein the second message carries a second unit type to be used to measure the chargeable service resource allocated to the user terminal;

determine, according to the second unit type, a second quantity of units of the chargeable service resource to be requested from the online charging system;

send a second credit request to the online charging system, wherein the second credit request comprises the second unit type and the second quantity of units of the chargeable service resource requested from the online charging system; and receive a second credit response from the online charging system, wherein the second credit response carries the second quantity of units of the chargeable service resource allocated to the user terminal.

\* \* \* \* \*